(12) United States Patent
Mather et al.

(10) Patent No.: US 6,419,971 B1
(45) Date of Patent: Jul. 16, 2002

(54) PROCESS FOR INJECTING THERMAL FLUIDS FOR FOOD PROCESSING

(75) Inventors: Donald A. Mather; John E. Gaydos; Donald L. Burge, Jr.; Jeffrey L. Schoewe, all of Sandusky; Ramesh M. Gunawardena, Chagrin Falls, all of OH (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/704,259

(22) Filed: Nov. 1, 2000

Related U.S. Application Data

(60) Provisional application No. 60/168,328, filed on Dec. 1, 1999.

(51) Int. Cl.[7] .................................................. A23L 1/00
(52) U.S. Cl. ...................... 426/510; 426/511; 426/523; 426/524
(58) Field of Search ................................. 426/231, 510, 426/511, 523, 524; 99/532, 533; 126/369

(56) References Cited

U.S. PATENT DOCUMENTS

| | | | |
|---|---|---|---|
| 4,190,100 A | 2/1980 | Wallace | 165/48 R |
| 4,291,617 A | * 9/1981 | Miller et al. | 99/532 |
| 4,303,687 A | 12/1981 | Ratjen | 426/497 |
| 4,452,132 A | * 6/1984 | Miller et al. | 99/532 |
| 4,551,338 A | 11/1985 | Wallace | 426/281 |
| 4,663,173 A | 5/1987 | Clatfelter et al. | 426/281 |
| 4,834,063 A | 5/1989 | Hwang et al. | 126/21 A |
| 4,906,485 A | 3/1990 | Kirchhoff | 426/506 |
| 4,940,040 A | 7/1990 | Randall et al. | 126/21 A |
| 5,605,093 A | 2/1997 | Higashimoto | 99/533 |
| 5,609,095 A | 3/1997 | Lemke et al. | 99/468 |
| 5,657,686 A | 8/1997 | Gunawardena et al. | 99/478 |
| 5,826,496 A | 10/1998 | Jara | 99/443 |
| 5,908,648 A | 6/1999 | Afman et al. | 426/92 |

FOREIGN PATENT DOCUMENTS

| | | |
|---|---|---|
| DE | 2 205 987 | 8/1973 |
| DE | 1 593 821 | 7/1981 |
| DE | 44 04 381 C1 | 11/1995 |
| EP | 129 673 | 1/1985 |
| JP | 10009575 | 1/1998 |
| WO | 80/01131 | 6/1980 |

* cited by examiner

Primary Examiner—George C. Yeung
(74) Attorney, Agent, or Firm—Pauley Petersen Kinne & Erickson

(57) ABSTRACT

A process for internally cooking food includes the steps of injecting a condensable cooking fluid into the interior of the food at a plurality of spaced-apart locations, dispersing the cooking fluid within the interior, and condensing the cooking fluid while in direct contact with the interior. The heat of condensation of the cooking fluid releases considerable heat energy useful for either pre-cooking the food to a desired intermediate cooking level, or thoroughly cooking the food. The heat of condensation of the fluid is high enough that only a small amount of condensable cooking fluid is required, per quantity unit of food being cooked. As a result, the food does not become excessively loaded with cooking fluid, and flavorants such as marinade substantially remain within the food. Where the condensable fluid is used for pre-cooking, the cooking may be thoroughly completed by placing the pre-cooked food in a conventional hot air oven. The pre-cooking or thorough cooking of food using properly injected condensable cooking fluid, considerably reduces the total cooking time compared to conventional oven cooking.

68 Claims, 13 Drawing Sheets

PROCESS FOR INJECTING THERMAL FLUIDS FOR FOOD PROCESSING

RELATED APPLICATIONS

This patent application claims priority based on U.S. Provisional Application Ser. No. 60/168,328, filed Dec. 1, 1999.

FIELD OF THE INVENTION

This invention relates to a method and apparatus for cooking food using the heat of condensation from a condensable inert gaseous fluid that is injected directly into the interior of the food. As used herein, the term "cooking" includes partial cooking or pre-cooking, and is not limited to complete or total cooking. The term "injected" requires direct surface contact between the condensable fluid and the interior of the food. Fluid which is passed in and out of the food through a recirculating tube without touching the food, is not "injected" as the term is used herein.

BACKGROUND OF THE INVENTION

In today's fast-paced economy, consumers are relying more than ever on pre-packaged, prepared meals and meal items which can be made ready to eat by heating in a microwave or conventional oven for a short period of time. The phrase "prepared meals and meal items" refers to entire meals, and meal entrees, which are prepared and cooked by a manufacturer, packaged, often frozen, and sold to consumers in a form almost ready for consumption. Spurred by the high consumer demand, the quality, variety, and number of brands of prepared frozen meals and meal items have risen in tandem. Markets for prepared meals and meal items have expanded to include special child and toddler meals, restaurant meals, and hospital meals as well as typical adult meals.

One strict requirement for prepared meals and meal items is that they be totally safe for consumption. Among other things, the meals and meal items must be thoroughly cooked by the manufacturer prior to freezing and shipping. The short preparation times tolerated by the consumer, along with the uneven heating provided by microwave ovens and variations between different ovens, preclude reliance on the consumer to accomplish any part of the required cooking.

Because of uneven heating and other complications, manufacturers typically have not relied heavily on microwave ovens to accomplish the required internal cooking. More often, manufacturers rely on large, conventional hot air or impingement ovens (sometimes employing moist air) to cook the food products from the outside in. When cooking poultry and meats, especially those containing bones, the cooking times required for hot air or impingement ovens can be quite long. Manufacturers have sought to reduce this cooking time using a variety of pre-cooking techniques.

One particular challenge is to cook bone-in products such as poultry, to an extent needed to eliminate any redness in the vicinity of the bone. This requires thorough cooking of the bone, often to 180° F. or higher. To achieve thorough cooking of the bone from the outside using a convection oven may result in excessive cooking of the surface portions of the food product and/or excessive cooking times. There is a need for a technique for cooking the bones and surrounding regions without excessively cooking the remainder of the food product.

In one pre-cooking technique, a hot gas such as air can be injected into the interior of the food using a plurality of closely-spaced injection nozzles or needles. The hot air can be injected at sufficient pressure, volume and temperature to elevate the interior of the food from a lower temperature to a desired higher temperature prior to placing the food in an oven, thus reducing the required cooking time in the oven. However, the heat capacity of air is quite low compared to the heat capacities of the solid and liquid-containing foods being heated. Accordingly, the amount of energy released by taking air from a higher to a lower temperature, and/or from a higher to a lower pressure, is low enough that a high volume of the air may be required to elevate the food temperature by any desired amount. The injection of too much hot air can cause unwanted drying of the food.

In another pre-cooking technique, a hot aqueous liquid can be injected into poultry or meat to raise its internal temperature. This technique has an advantage in that the heat capacity of the liquid being injected is much closer to the heat capacity of the food being heated. On the other hand, the quantity of liquid being injected is quite limited by the need to avoid over-saturation and/or excessive rinsing of the food.

In another pre-cooking technique, a plurality of closely-spaced, recirculating heat exchanger needles can be planted in the food, and a hot recirculating fluid (liquid or gas) can flow through the needles so that heat is transferred to the food through thin, heat-exchanger type needle walls. This technique has an advantage in that there is no direct contact between the heating fluid and the food. However, because the fluid cannot penetrate the food, the portions of food immediately adjacent to the heat exchanger walls may be heated to a greater extent than portions of the food away from the needles, resulting in uneven cooking.

There is a need or desire in the food industry for a process for cooking food from the inside which is uniform, efficient, and does not result in over-exposure of the food to a cooking fluid.

SUMMARY OF THE INVENTION

The present invention is directed to a process for cooking food from the inside which achieves the desired level of cooking using a condensable cooking fluid, which condenses from a gaseous to a liquid state while in direct contact with the food. As used herein, the term "condensable cooking fluid" refers to a fluid which undergoes a phase transition, from gas to liquid, at a temperature between about 100–450° F. at the pressure (if any) used for cooking. The heat of condensation of the fluid provides the heat that is needed to heat and cook the food. Because the heat of condensation is much larger than the amount of heat released by simply cooling a gas or a liquid from a higher temperature to a lower temperature, a much lower quantity of the condensable fluid is required, per pound of food being cooked, than would be required if the fluid did not undergo a phase transition from gas to liquid.

In accordance with the invention, the condensable cooking fluid is injected directly into the food at a plurality of (two or more) spaced apart locations, and the fluid cooks the food as it condenses inside the food. The quantity of condensable cooking fluid, per pound of food being cooked, is carefully controlled so as to heat the food from a known lower temperature to a desired higher temperature. The pressure of the fluid being injected is controlled so as to sufficiently diffuse the condensable cooking fluid within the food (i.e., away from the injection ports) to uniformly cook the food, without permitting excessive fluid to escape from the food before it condenses, and without causing excessive bleeding of flavorants such as marinade from the food. The product yield is thus maximized. The injection points or ports are spaced sufficiently close together so that the condensable fluid can diffuse and uniformly cook the food.

The process of the invention is particularly useful for the internal pre-cooking of frozen meals and meal items, including bone-in food products, with the final cooking step being accomplished by a conventional hot air or impingement oven. The process of the invention can also be used to thoroughly cook food items. The condensable cooking fluid is preferably inert to the food being cooked, and must be safe for consumption when cooled. One particularly useful condensable cooking fluid is steam. Steam is useful for the cooking of prepared meals and meal items, including larger multiple-serving meal items (turkeys, hams, roasts and the like) as well as individual meals and meal items. Condensing steam is also effective in cooking bones and surrounding regions, thus eliminating any redness in the final product. Generally, the quantity of condensable fluid used is sufficiently low so as not to materially affect the weight of the food product.

With the foregoing in mind, it is a feature and advantage of the invention to provide a process for internally cooking foods which uses a fairly low amount of condensable cooking fluid per pound of food being cooked.

It is also a feature and advantage of the invention to provide a process for internally cooking foods which performs an effective amount of cooking through direct contact between the food and an inert condensable cooking fluid, without adversely affecting the food quality.

It is also a feature and advantage of the invention to provide a process for internally cooking foods which uniformly cooks the food to a desired level, and which eliminates any redness in the vicinity of bones.

It is also a feature and advantage of the invention to provide a process for internally cooking foods which does not cause excessive escape of marinades and/or other internal flavorants from the food, thereby maximizing product yield.

It is also a feature and advantage of the invention to provide an integrated process for pre-cooking food using an inert condensable cooking fluid, and completing the cooking using a hot air or impingement oven, which results in energy savings, time savings, and improved product yield compared to current industrial cooking processes.

The foregoing and other features and advantages of the invention will become further apparent from the following detailed description of the presently preferred embodiments, read in conjunction with the drawings.

DETAILED DESCRIPTION OF THE PRESENTLY PREFERRED EMBODIMENTS

Figure 1:
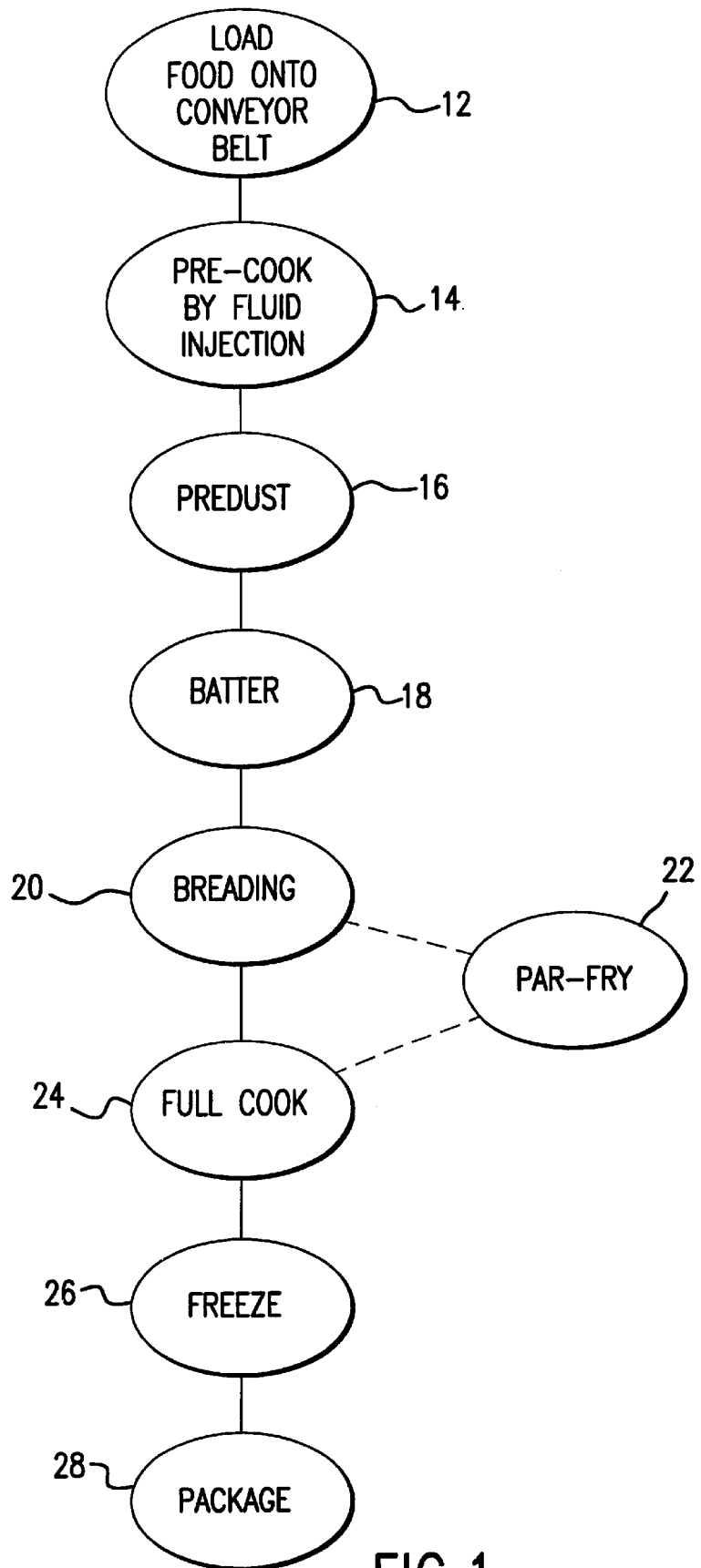
FIG. 1 is a block diagram of an exemplary food product cooking sequence, including the step of pre-cooking by condensable fluid injection in accordance with the present invention.

FIG. 1 is a schematic illustration of one example of an integrated process for cooking prepared meals and meal items. A food product is loaded on a conveyor belt 12. The conveyor belt transports the food product to a fluid injector 14 where the food product is pre-cooked by condensable fluid inserted into the food product. If the food product is to be breaded, the food product is then passed to a dusting station 16, a battering station 18, and a breading station 20. At this point the food product may optionally be subjected to a frying station 22. The food product is then conveyed to the hot air oven 24 where the cooking is completed. The food product is then frozen at station 26 and packaged at station 28 for delivery to the customer.

Figure 2:
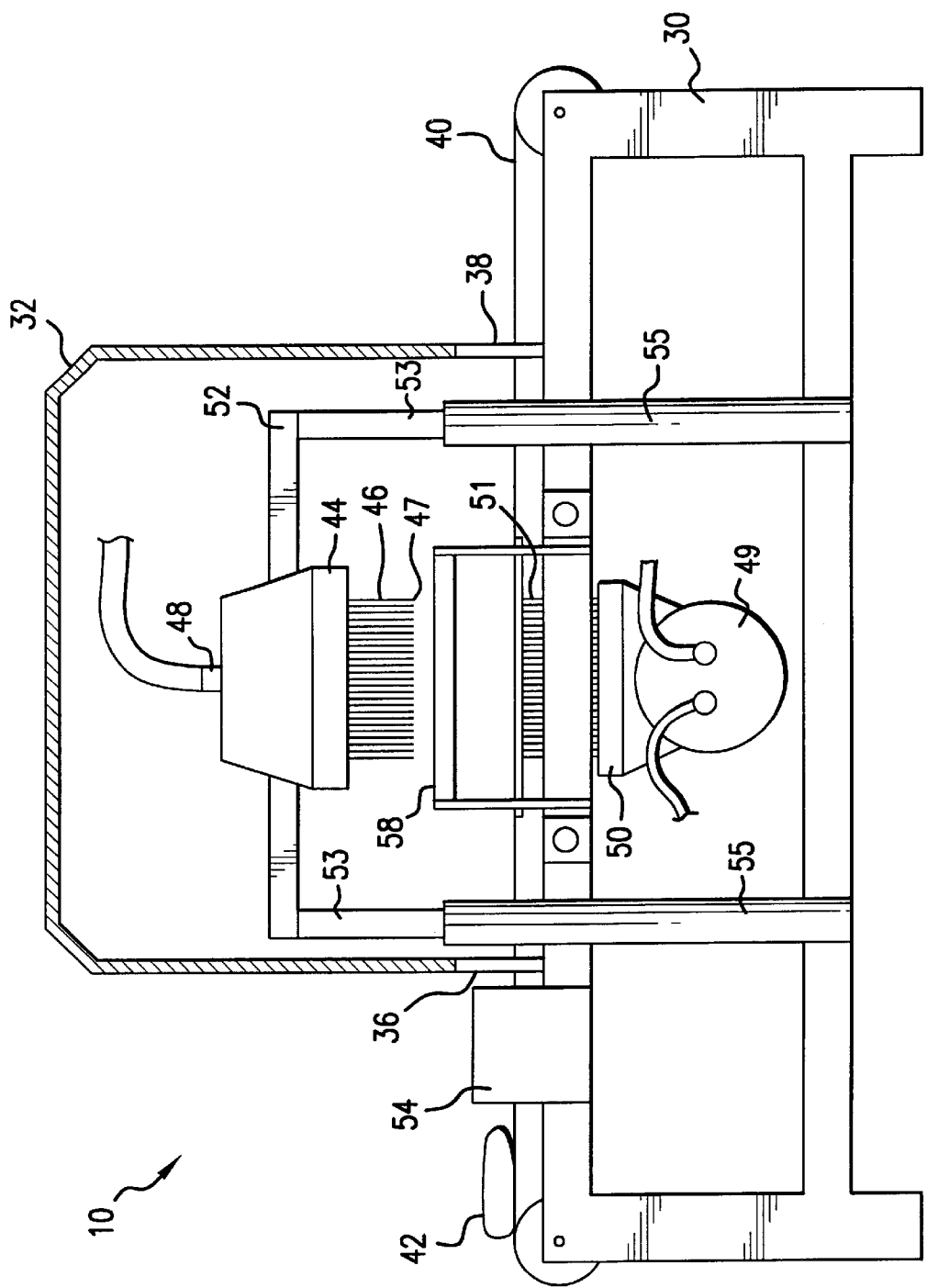
FIG. 2 is a side elevational view of a fluid injector apparatus useful in practicing the present invention.
Figure 3:
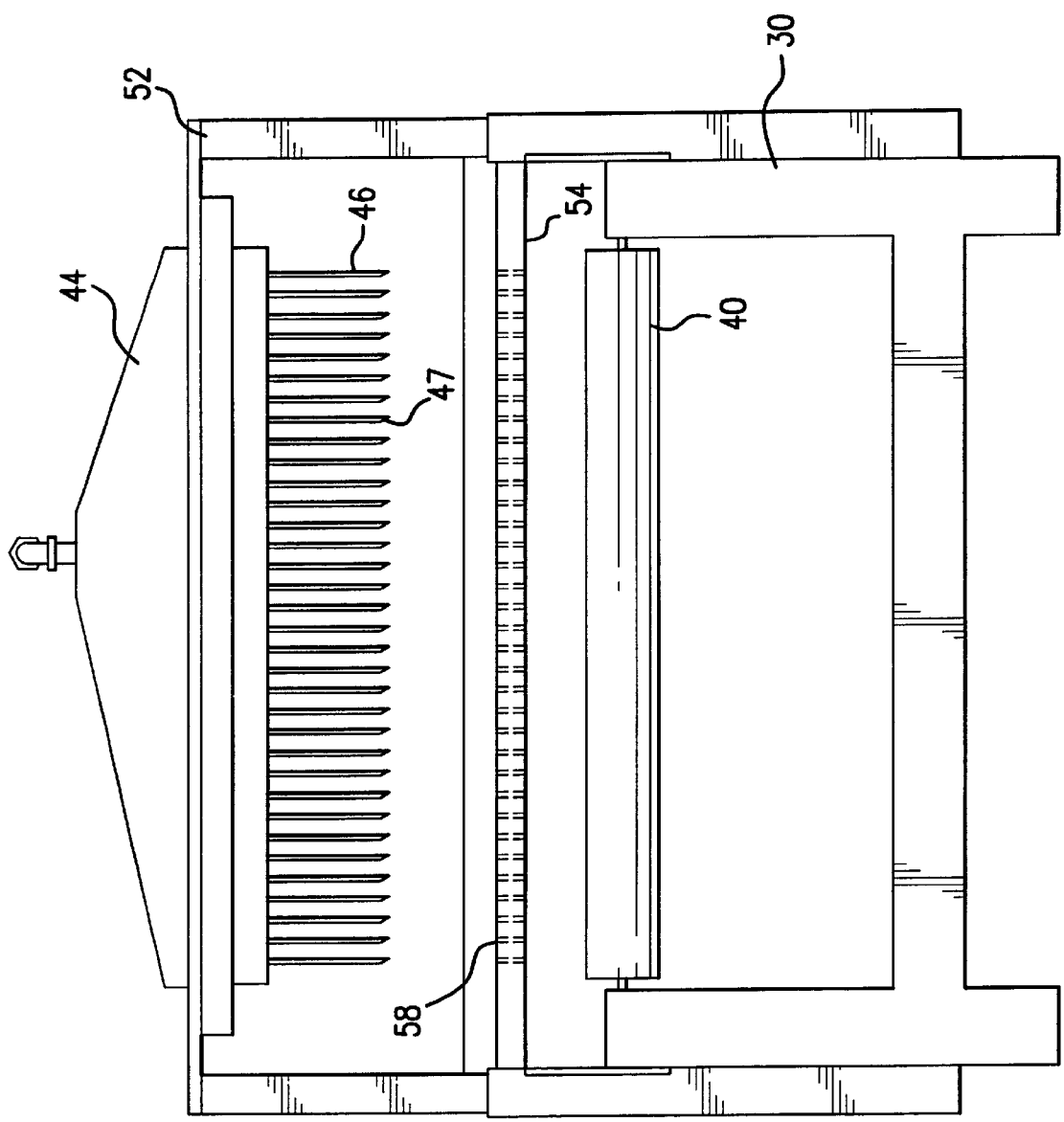
FIG. 3 is a front elevational view of the fluid injector apparatus of FIG. 2.

A fluid injection apparatus 10 useful for injecting the condensable fluid, is shown in FIGS. 2 and 3. FIG. 2 is a side elevational view of the apparatus and FIG. 3 is a front elevational view of the apparatus with the housing removed. The apparatus 10 includes a support frame 30 and a housing 32 with a product inlet 36 and a product discharge outlet 38. A conveyor belt 40 transfers the food product 42 through the housing 32.

The apparatus 10 includes an injection manifold 44 having a plurality of needles 46 extending downward therefrom and perpendicular to the conveyor belt 40. The needles 46 are fluidly connected through the manifold 44 to an inlet 48 connected to a pump and a source of fluid (not shown). The manifold 44 is connected to a carriage 52 which is capable of moving the manifold 44 vertically to a plurality of up and down positions. The food product 42 is placed on the conveyor belt 40, and is conveyed beneath an inlet guard 54 which ensures that any food product 42 which is either too big or stacked upon itself will be prevented from entering the housing inlet 36.

The conveyor belt 40 stops when the food product 42 is directly beneath the manifold 44. The carriage 52 forces the manifold 44 downward such that the plurality of needles 46 are inserted to a depth generally corresponding to the center of the food product 42. A condensable fluid, preferably culinary or sanitary steam made from pure (e.g., filtered) water, is introduced into the interior of the food product. The carriage 52 can be carried on each side by a piston rod 53 telescopically engaging a piston shaft 55. Each piston rod 53 may be driven pneumatically, or with springs, or with fluid pressure applied inside the shaft 55. The condensable fluid is injected into the food product 42 through the injection needles 46 under pressure from the source (not shown).

The steam contacts the interior of the food product 42, which is at a lower temperature. This causes the steam to condense, releasing heat energy as the steam undergoes a phase change. Because there is a phase change, heat transfer from the fluid to the food product may occur without substantially changing the temperature of the fluid. The latent heat energy of the vapor has a heat transfer coefficient and rate which is generally much larger than those characteristic of convection heat transfer without a phase change. The use of a condensable fluid allows a maximum amount of energy to be injected into the interior of the food product 42 while minimizing the volume of the residual fluid remaining in the food product 42.

Once the fluid has changed phase into a liquid, the heat energy continues to be transferred into the interior of the food product by conduction. The condensed fluid continues to transfer heat into the interior of the food product 42 until the temperature thereof and the interior temperature reach equilibrium. The amount of condensable fluid and injection time will vary based upon the particular food products being treated and the desired end point temperature for the product interior.

Once the steam is injected into the food product 42, the manifold 44 is elevated to retract the needles 46 from the food product 42. A stripper 58 is positioned between the food product 42 and the needles 46 to prevent the food product 42 from sticking to the needles 46. The stripper 58 may include a plate having a plurality of openings which enable the needles 46 to be extended and retracted through the plate while preventing the food product 42 from sticking to the needles 46. The conveyor belt 40 then moves the food product 42 out of the housing to allow processing of the food product 42 to continue.

In some applications, the apparatus 10 will be used to pre-cook or partially cook food by bringing its internal temperature from a lower refrigeration temperature of about 32–45° F. to a higher cooking temperature of about 80–130° F., with the final cooking step occurring in a downstream hot air oven (which further elevates the food temperature to about 160–210° F.). When steam is employed as the condensable cooking fluid, this pre-cooking can be accomplished using a fluid injection rate of about 0.01 to 0.25 pounds of steam per pound of food being cooked, typically about 0.02 to 0.15 pounds of steam per pound of food being cooked, suitably about 0.03 to 0.08 pounds of steam per pound of food being cooked, desirably about 0.04 to 0.07 pounds of steam per pound of food being cooked. The fluid quantities will vary depending on the type of food being cooked and the amount of cooking desired. To elevate poultry from a refrigeration temperature of 32–35° F. to a pre-cooking temperature of 110° F. requires about 0.054–0.065 pounds of steam per pound of poultry being cooked.

One advantage of pre-cooking the food to an intermediate temperature of 80–130° F. or, more suitably 90–120° F., is that the amount of steam required is not so large as to cause excessive bleeding of marinade and/or other flavorants. Yet, the elevation in temperature is sufficient to enable a substantial reduction in downstream cooking time in the hot air or impingement oven, particularly for bone-in and large food items such as turkeys, roasts and hams. In effect, the overall product yield (which is a function of cooked product quantity per unit time and percentage of acceptable product) can be optimized with these steam quantities and pre-cooking temperatures.

The steam or other condensable fluid should be injected under sufficient pressure to allow substantial penetration of the fluid into the product being cooked, but not so much pressure that excessive fluid escapes (e.g., percolates) from the food product before it condenses. Preferably, the steam is injected as superheated steam. To ensure optimum results, the steam should be injected at a pressure of about 5–50 psig., suitably about 10–40 psig, desirably about 20–30 psig. Steam injection at a pressure of 23–28 psig (corresponding to a saturated steam temperature of 263–271° F.) is preferred for meat and poultry applications.

Another important variable is the needle density, i.e., the number of injection needles 46 per unit area. Preferably, the needles are uniformly spaced apart. If the needle density is too low, then it is difficult for the steam to uniformly penetrate and cook the food. If the needle density is too high, then the overall steam quantity (at a given pressure) is high, and higher energy is required to press the needle array into the product. Useful needle densities may range from about 1–30 needles per square inch, suitably about 3–25 needles per square inch, desirably about 5–20 needles per square inch.

Figure 13A:
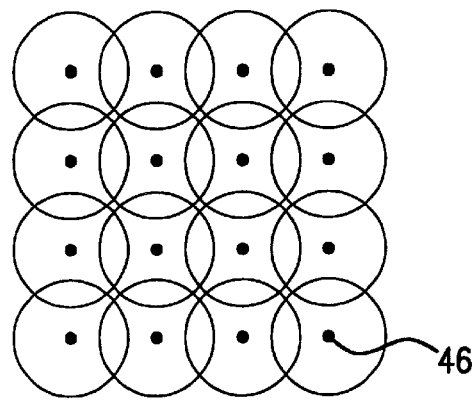
FIGS. 13(*a*), 13(*b*) and 13(*c*) are schematic views showing three alternative pattern arrangements for the fluid injection needles.
Figure 13B:
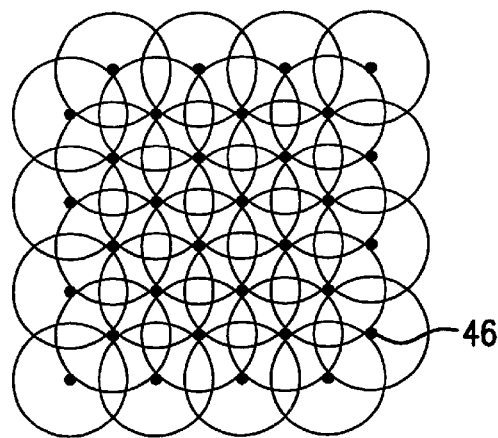
Figure 13C:
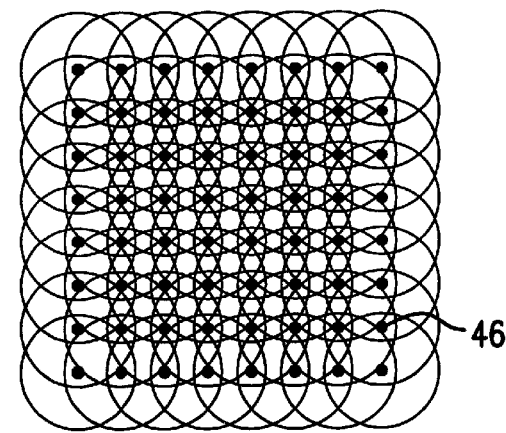

Exemplary arrangements of needles 46 are shown in FIGS. 13(*a*) through 13(*c*), in which needles 46 are represented by points. The circles surrounding and/or connecting the needles help illustrate different needle patterns, but are not otherwise indicative of structure. FIG. 13(*a*) represents a desired pattern for a lower level of needle density, ranging up to about 5 needles per square inch. FIG. 13(*b*) represents a desired pattern for a somewhat higher needle density, ranging from about 5–10 needles per square inch. FIG. 13(*c*) represents a desired pattern for a still higher needle density, ranging from about 10–20 needles per square inch and possibly higher.

Another variable is the residence time of the needles in the food product, which generally corresponds to the cycle time required to complete the steam injection. Normally, the desired amount of steam can be injected in about 1–60 seconds, suitably about 2–30 seconds, desirably about 3–10 seconds. At 5 seconds, for instance, the steam injection residence time is about 0.55% of a typical oven cook time of 15 minutes, illustrating the time efficiency of using condensing steam to help cook the food. Preferably, the steam is injected continuously while the needles are being extended into and retracted from the food product. This way, portions of the steam are injected at different elevations within the food product, facilitating more uniform cooking of the food. Alternatively, all of the steam may be injected when the needles are stopped at a desired level within the food product.

Referring again to FIGS. 2 and 3, the needles 46 may be configured with a single injection opening 47 located at a lower end of each of the needles. Alternatively, the injection opening 47 may be along a side of each of the needles, and/or each needle may have more than one injection opening 47. Each needle 46 has a penetration length and indexing time sufficient to allow the desired level and time of penetration into the food product being cooked. Depending on the application, the needles 46 may have penetration lengths of about 0.5–10 inches, suitably about 1.0–5.0 inches, commonly about 1.5–3 inches. The overall length of each needle is typically longer than the length which penetrates the food, so that steam may be fed into each needle at a location along the needle which remains outside of the food. Needle lengths may be about 4–8 inches longer than the portion which enters the food.

The term "index length" refers to the length of each cycle, i.e., the distance that the food conveyor underneath needles 46 travels between each penetration, injection and retraction cycle of the needles 46. Depending on the application, the index length is generally about 1–12 inches, more typically about 4–8 inches. When the index length is very short, a single meal or meal item may experience steam injection more than once as it passes beneath needles 46.

The needles 46 may be individually biased with respect to the manifold 44 to permit variable insertion levels for different needles. For instance, if it is desired to insert the needles 46 by 6 inches into a product, and if some of the needles are stopped after two inches of injection because they interact with a hard bone, the remainder of the needles should be permitted to penetrate by the desired level of depth. By having the needles 46 individually biased with respect to manifold 44, the remainder of the needles 46 may reach the desired depth even though one or more needles have been interfered with at a higher elevation. The individual bias may be accomplished by pneumatically loading and driving needles 46 at a first end opposite the injection openings 47. The biasing pneumatic load may range from about 1–50 psig, suitably about 2–30 psig, commonly about 5–15 psig depending on the application. If the pneumatic load is too high, the needles 46 may penetrate and damage bones and other hard objects in the food product. If the pneumatic load is too low, the needles 46 may insufficiently penetrate even the soft portions of the food product.

The first side and opposing second side of a food product may be cooked separately, for instance in separate stages. In one alternate embodiment as shown in FIG. 2, the apparatus 10 includes a second manifold 50 having a second plurality of needles 51 located underneath the conveyor belt 40, for injecting the food product 42 with steam from the reverse side of the food product 42. When using a second manifold 50, the needles 51 must protrude through the conveyor belt 40. It is also contemplated that the stripper 58 can be lowered onto the food product 42 on the conveyor belt 40 to provide a backing such that the food product 42 is properly held in place when the needles 46 and 51 of the manifolds 44 and 50 are inserted into the food product 42. Alternatively, a second stripper 58 may be located below the conveyor belt 40. It is contemplated that injection needles will be manipulated to introduce the condensable cooking fluid at or near the center of the food products, as this is the primary region to be pretreated. The vertical movement of the needles may thus be controlled to accomplish this objective, depending on the characteristics of the food products.

Figure 4:
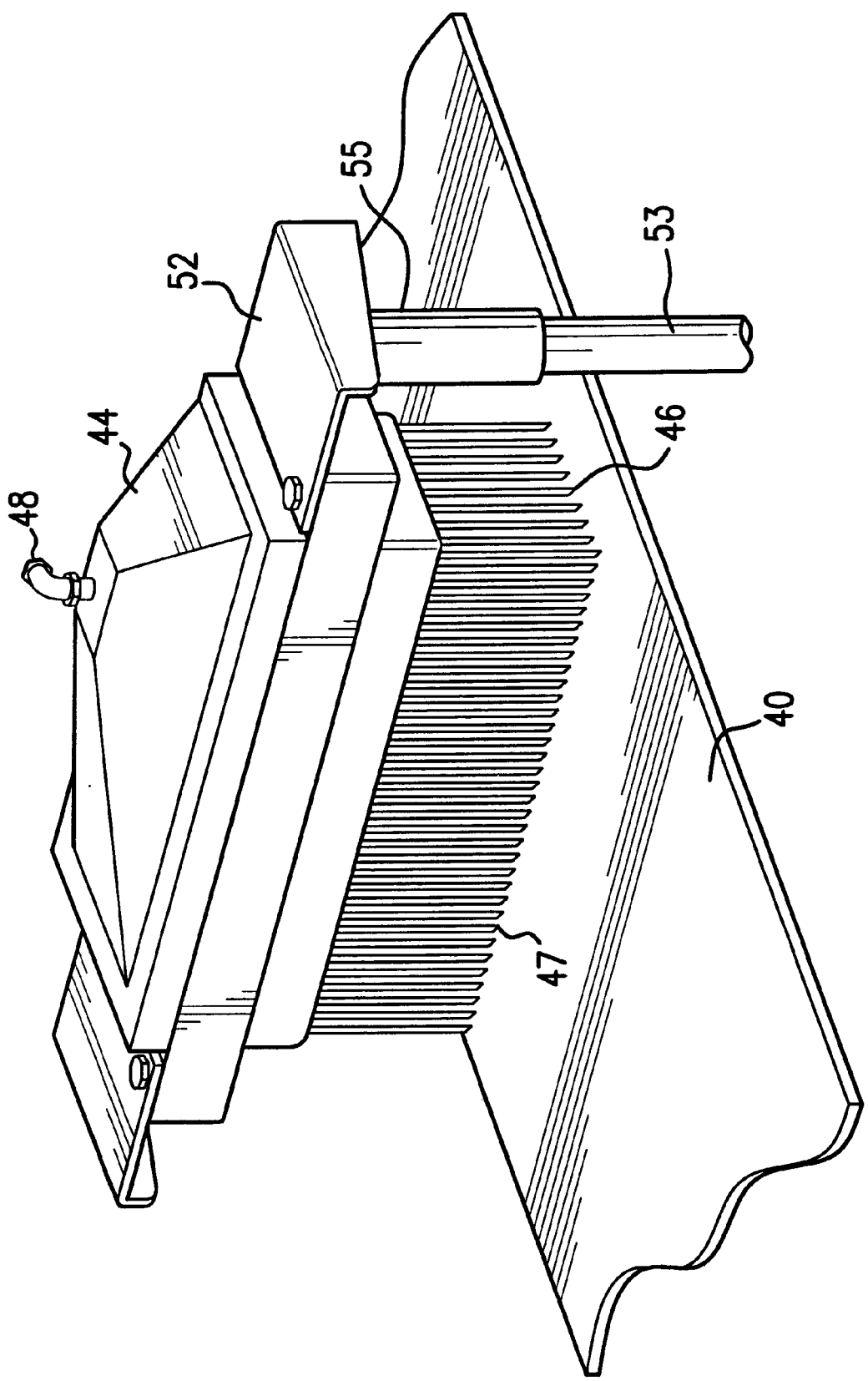
FIG. 4 is a perspective view of the manifold and plurality of needles of the apparatus of FIG. 2.

In another alternative embodiment, both sides of the food product may be treated using the first assembly of manifold 44 and needles 46 shown in FIGS. 2–4, or two similar injection assemblies located on the same side of the conveyor belt 40. Initially a first side of the food product is treated with steam by lowering injection needles 46 into the product. After the injection is completed, the food product is flipped over whereupon a second side of the food product is steam treated using the same or a different set of needles 46 mounted to the same or a different manifold 44.

The conveyor belt 40 may also have a plurality of holes (not shown) which are positioned and timed to allow the needles 46 to pass through the conveyor belt 40 if the injection needle design introduces the thermal fluid into the food products above the tip of the needles. The conveyor belt 40 is designed to have sufficient rigidity to withstand the force created when the upper manifold 44 pushes down on the food product when injecting its needles 46. Alternatively, a support can be used beneath the conveyor belt 40 to provide the required structural integrity for the injection process.

Figure 12:
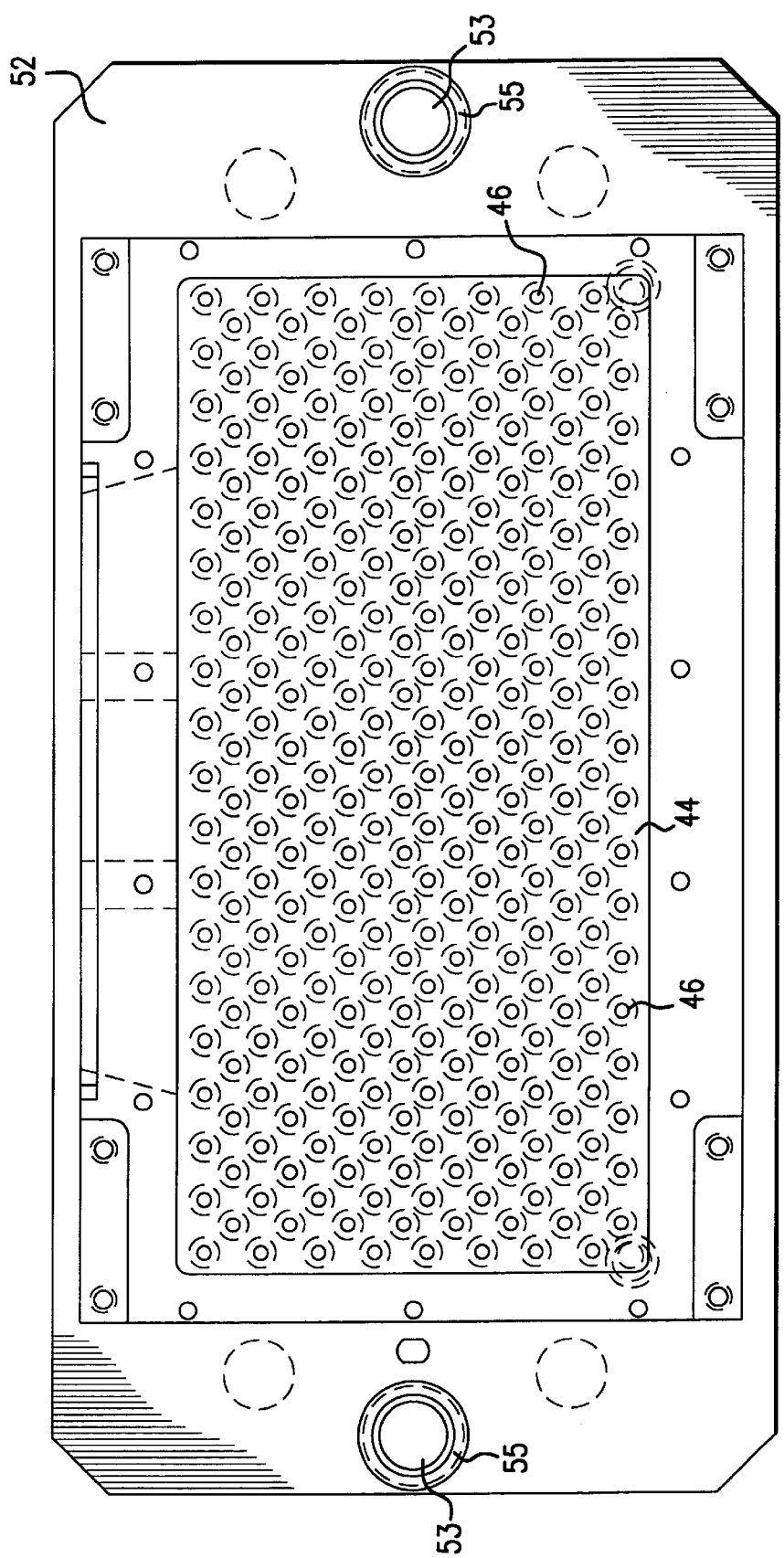
FIG. 12 is a bottom plan view of the apparatus, showing an arrangement of closely spaced fluid injection needles.

Turning now to FIG. 4, a perspective view of an injector manifold 44 is shown positioned over a conveyor belt 40. The plurality of needles 46 are shown forming a flock of injectors having a predetermined width and depth. The amount of needles 46, the density of the needles 46 per area, and the length of the needles 46 are all predetermined in accordance with the intended use of the apparatus 10, the types of food products to be treated, and the level of cooking desired. FIG. 12 is a bottom plan view of the needle arrangement shown in FIG. 4, wherein the needles 46 are arranged in a pattern as shown in FIG. 13(b), discussed above. The entire array of needles 46 shown in FIG. 12 includes 280 needles. Such a large array of needles 46 can be used to cook a large food item, for instance a large turkey, roast or ham. Smaller needle arrays (having fewer needles) may be used to cook individual meals and meal entrées. Alternatively, a large array of needles (as shown in FIG. 12) may be used to cook several smaller meal items, placed side by side, at the same time.

Figure 5:
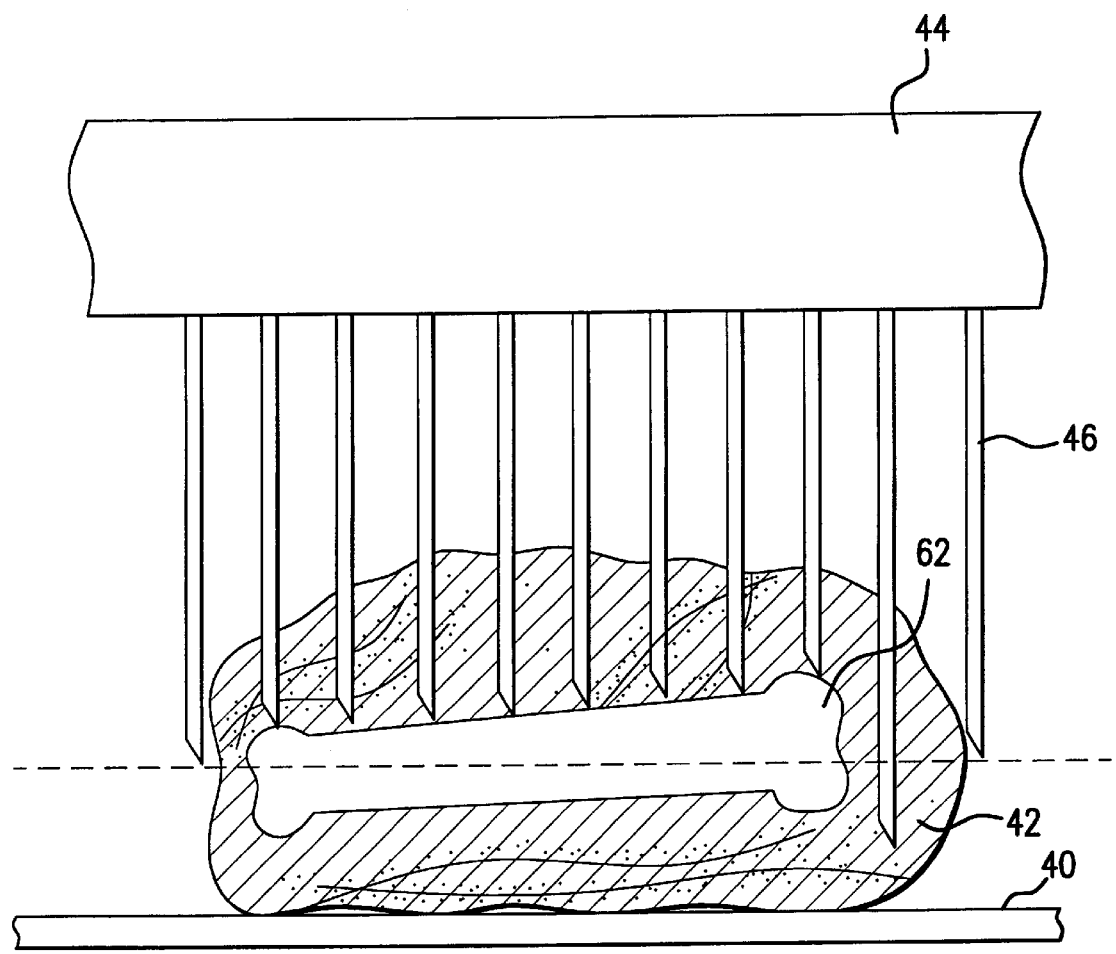
FIG. 5 is a cross-sectional view of the plurality of needles penetrating the interior of a bone-in food product.

FIG. 5 depicts a partial cross-sectional view of a bone-in food product 42 on a conveyor belt 40 being injected by needles 46 of an injector manifold 44. The individual needles 46 project into the food product 42 until they encounter a bone 62 which stops their downward motion. It is contemplated that each needle 46 will extend to a predetermined depth if it does not encounter a bone 62. The predetermined depth preferably corresponds to the center of the food product 42. The individual hinging of needles 46, described above, allows the needles to reach varying depths. It is also contemplated that the targeted depth for each needle can be determined for each food product individually. The apparatus 10 may be configured to sense when the needles 46 are inserted into the food product, and calculate the location of the center of the food product in relation to the conveyor belt height and the entering height of the needles 46.

Figure 6:
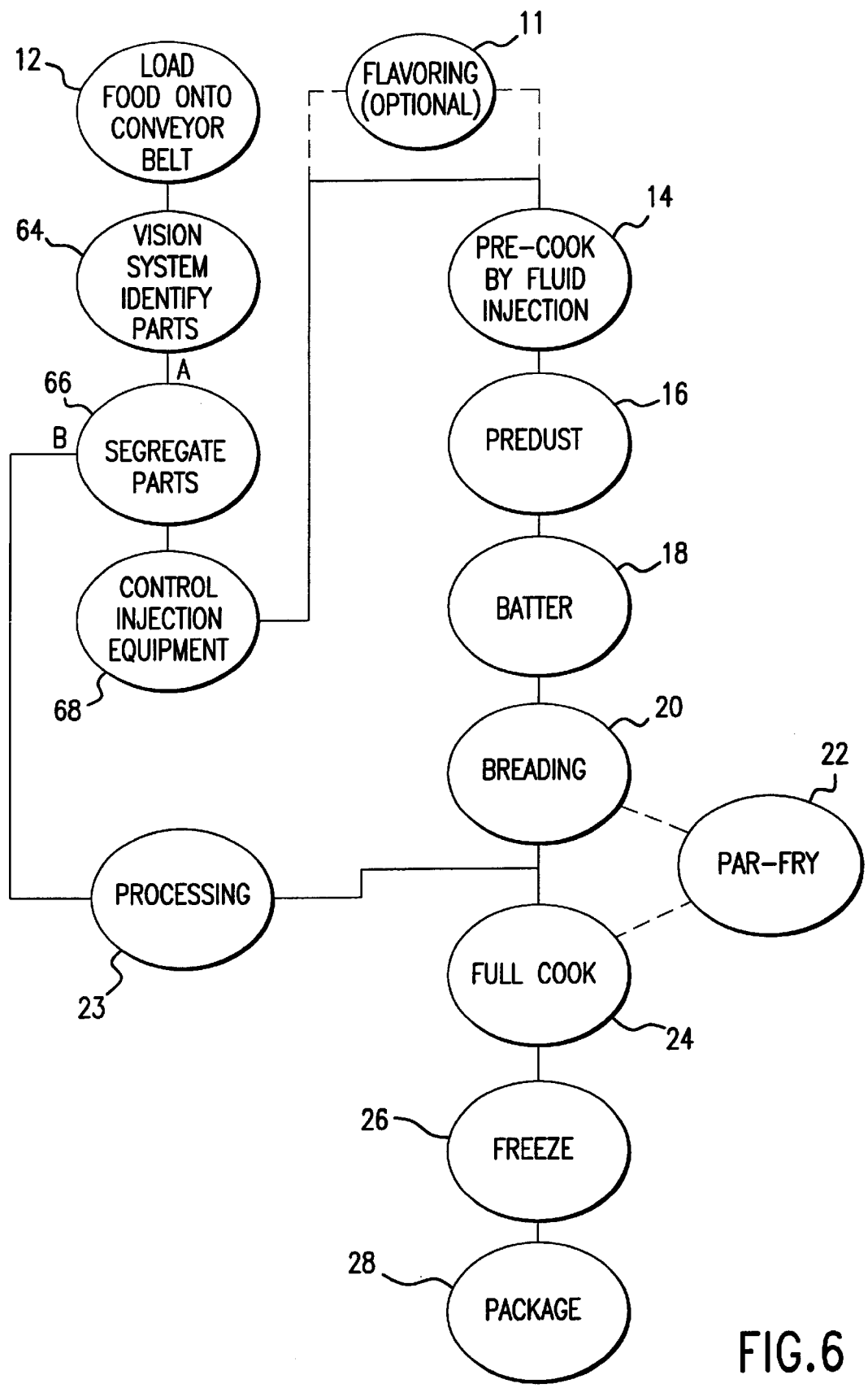
FIG. 6 is a block diagram of an exemplary food product cooking sequence including the step of using a vision system to facilitate processing of the food product to the fluid injector apparatus in accordance with the present invention.

Referring now to FIG. 6, another integrated process for cooking prepared meals and meal items is schematically shown. A food product is loaded on a conveyor belt 12. A vision system 64 is provided with the capability to identify the configuration of the food products, such as size, thickness or the like on the conveyor 12. The identified food products may then be segregated at station 66 onto different belts or paths A and B, according to their configuration as detected by the vision system. The conveyor belt A transports the first selected food products to individually controlled fluid injection systems where each selected food product is pre-treated by a condensable fluid inserted into the food product by the fluid injection system 14. In this manner, products having similar characteristics can be processed together to achieve desired results. If the food is to be marinated or otherwise flavored, the flavorant may be injected before or after the condensable fluid at flavoring station 11, and is preferably injected before the condensable fluid as shown.

The conveyor belt B takes the second selected food products through a processing 23 which may or may not include the same processing stations and steps as described for the first selected food products on conveyor belt A. For instance, a chicken may be separated into breasts and thighs on belt A which are subject to pre-cooking, and wings and drums on belt B which may not require pre-cooking due to their smaller sizes. When the breasts, thighs, wings and drums reach the oven 24, they may experience the same cooking time which is sufficient to a) fully cook the wings and drums, and b) finish the cooking of the breasts and thighs. This way, over-cooking of the smaller items is avoided, and the overall product yield is optimized.

The segregation of the food products in this way would also allow separate injection systems to be used to increase the volume of condensable fluid or dwell time for the larger pieces and/or decrease or eliminate these variables for the smaller pieces. This will ensure more heat energy is transferred to the larger pieces. The volume of condensable fluid, dwell time or other processing characteristics can be controlled by a control system 68, and in this embodiment in conjunction with the vision system 64, to optimize the processing characteristics based on the sizes or other characteristics of the food products. Again, if the first selected food product is to be breaded, the food product is then pre-dusted at station 16, battered at station 18, and breaded at station 20. At this point the food product may optionally be subjected to a frying step at station 22. The food product is then conveyed to the oven where the food product is fully cooked at convection oven 24. The food product is then frozen at station 26 upon removal from the oven and packaged at station 28 for delivery to the customer. These processing steps may or may not be included, or may be performed differently, for the second selected food products on belt B.

Figure 7:
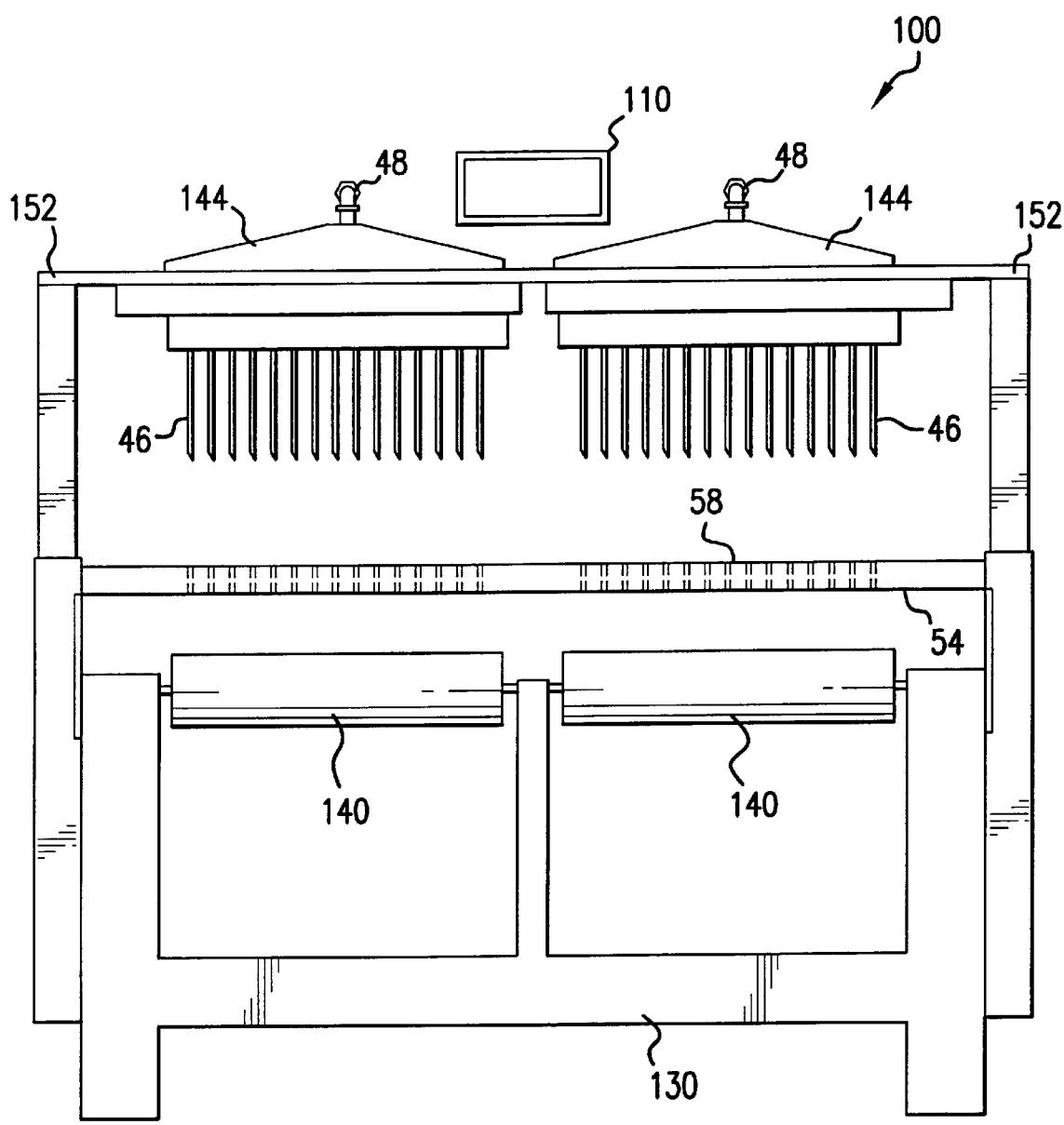
FIG. 7 is a front elevational view of an alternate embodiment of the invention showing a dual conveyor and dual injection system.

Turning now to FIG. 7, a dual conveyor injector apparatus 100 is shown in a front elevational view. The vision system 110 is shown above the apparatus 100. The vision system 110 can be any system that can detect and identify moving objects and provide control signals to either sort the detected objects based on a specific criteria, or to control operation of the apparatus 100, or both. The vision system 110 can be designed to provide signals directly to the apparatus 100 to control items such as injection dwell time and injection depths for individual needles in the system. In the preferred embodiment, the apparatus includes two or more conveyor belts 140 and two or more injection manifolds 144 each connected to an inlet 48 and a plurality of needles 46. The manifolds are supported and controlled by carriages 152 attached to the frame 130 of the apparatus 110. The apparatus also comprises inlet guard 54 and stripper plate 58.

Figure 8:
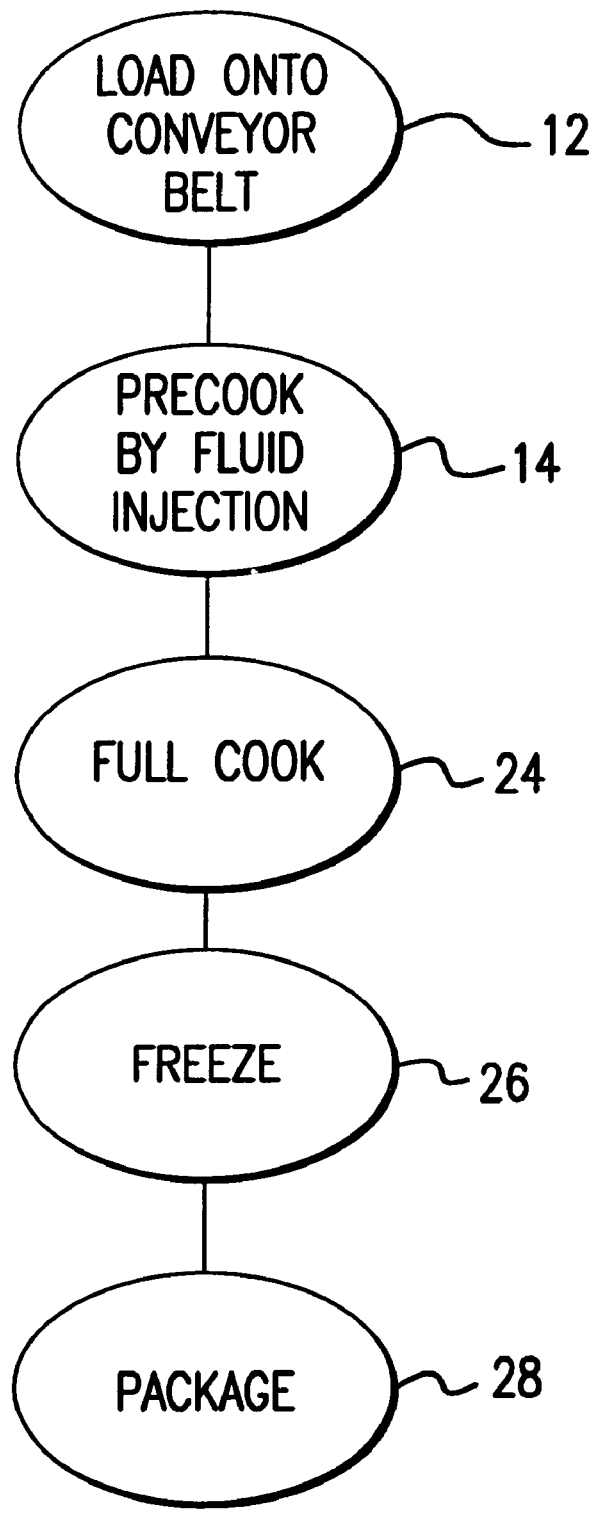
FIG. 8 is a block diagram representation of a food product cooking sequence where food products are fully cooked directly after the pre-cooking in accordance with the present invention.

FIG. 8 schematically illustrates a simplified integrated process for cooking prepared meals and meal items, where a breading step is not needed. This process may be used to cook large turkey parts, hams, roasts, beef sections and the like. Such products are difficult to fully cook in a convection oven, without the aid of steam injection, because their large interior portions cannot be adequately cooked in a reasonable time, particularly if bones are present. The food products are placed onto the conveyor belt 12 and transported to the fluid injection apparatus 14, where the large food products are pre-cooked. Desirably, the large food items may be subjected to pre-cooking by both an upper needle injection manifold 44 and a lower needle injection manifold 50, as explained above with respect to FIG. 2. The dwell time and/or amount of fluid injected will be proportionately increased to account for the larger mass of these food products. The density of the needles 46 and 51 per unit area may also be increased in the manifolds 44 and 50. It is preferred that the steam be injected at a predetermined rate during the extension and retraction of the manifolds 44 and 50 such that the needles 46 and 51 inject steam from the time they first penetrate the food item, throughout their downward or upward movement in the food product. To conserve condensable fluid, the apparatus may be controlled to only inject when the needles 46 and 51 are in contact with the food products. This will provide more heat energy and facilitate the pre-cooking process by contacting more area of the interior with condensable fluid. The food products are then directly conveyed to a convection oven 24 where they are fully cooked, then frozen at station 26 and packaged at station 28 for delivery to the retailer or end user.

Figure 9:
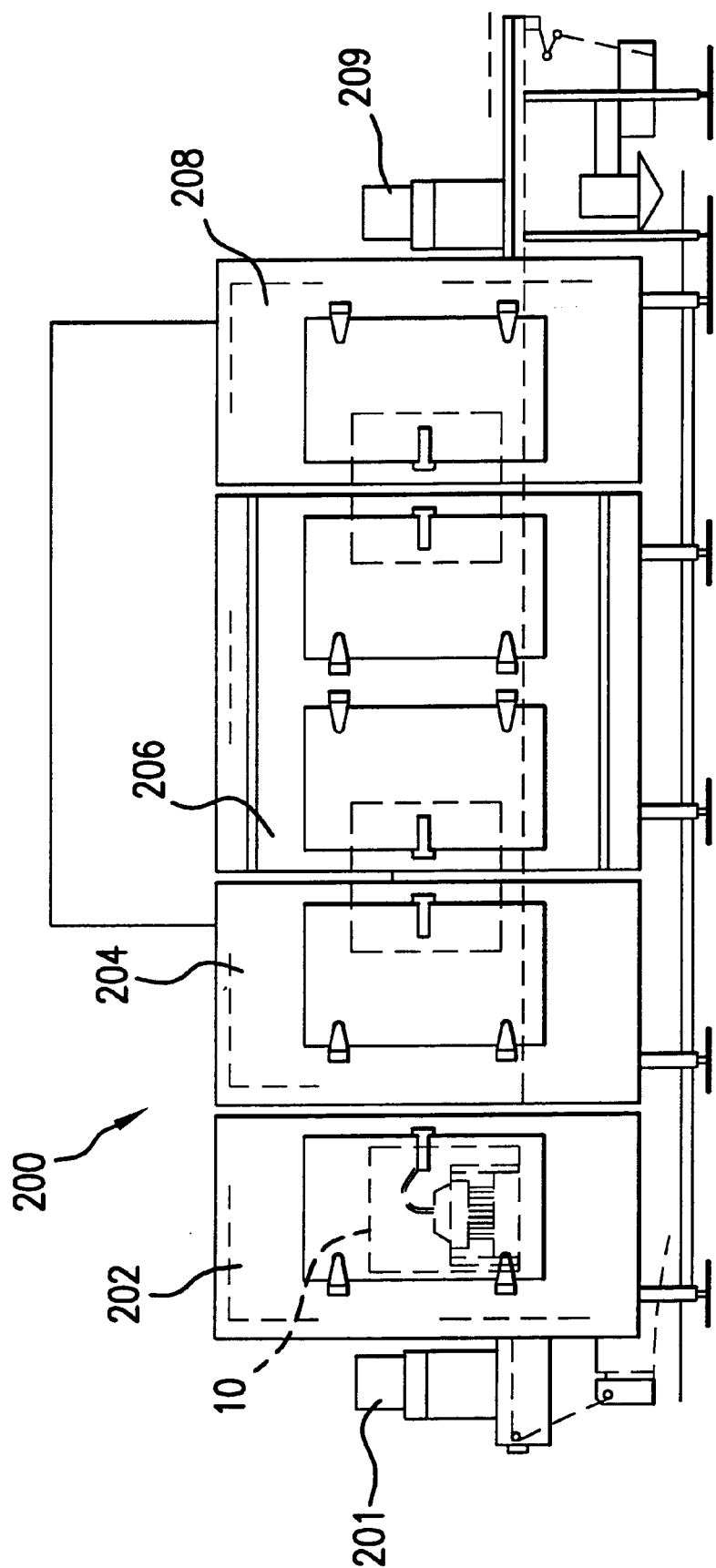
FIG. 9 is a side elevational view showing the fluid injection apparatus in phantom within a conventional convection oven.

Although the fluid injection apparatus 10 has been shown as a stand-alone unit, the apparatus can be made as an integral part of a heated air convection oven. Referring now to FIG. 9, the fluid injector apparatus 10 is shown within a convection oven 200 having multiple cooking stages 202, 204, 206 and 208. The apparatus 10 is mounted in the first stage 202 of the oven 200 such that the food product entering the oven 200 is pre-cooked by the apparatus 10 and then fully cooked in the remaining stages 204, 206 and 208. If steam is used as the condensable cooking fluid, the introduction thereof into the oven housing will also facilitate the cooking operation as steam is conventionally introduced into such ovens to maintain the moisture content of the food products during cooking.

The operation of the convection oven 200 is otherwise conventional, and need not be discussed in detail. Briefly, recirculating hot air (preferably directly or indirectly heated by natural gas or another fossil fuel) enters the lower part of oven 200 at the final stage 208, so that the final stage 208 is the hottest part of the oven. The hot air passes through the stages 206, 204 and 202, and exits through outlet 201. The hot air cools somewhat as it heats and cooks the food product, thus rendering the first cooking stage 202 the coolest part of the oven. Some of the hot air is exhausted through ports 201 and 209, and a corresponding amount of room air is drawn in with the food, or separately.

The air temperature within the oven, and the hot air flow rates, are selected so as to finish the cooking of the food product. Each food product must be cooked to an elevated internal temperature which is at least high enough to meet food safety requirements. Poultry, for instance, must be thoroughly cooked to at least 160° F. according to Hazard Analysis Critical Control Point (HACCP) requirements, meaning that each and every part of the poultry must reach or exceed that temperature. To accomplish this, and allow a safety margin, the temperature in the final stage 208 of the oven 200 may be set to reach 180–200° F. As explained above, the residence time of the food in the oven 200 may be on the order of 15 minutes, or may be shorter or longer depending on the type and size of the food articles being cooked. The residence time and heat supplied must be sufficient to assure that all portions of the food reach or exceed the required U.S.D.A. temperature for total elimination of bacteria.

Figure 10:
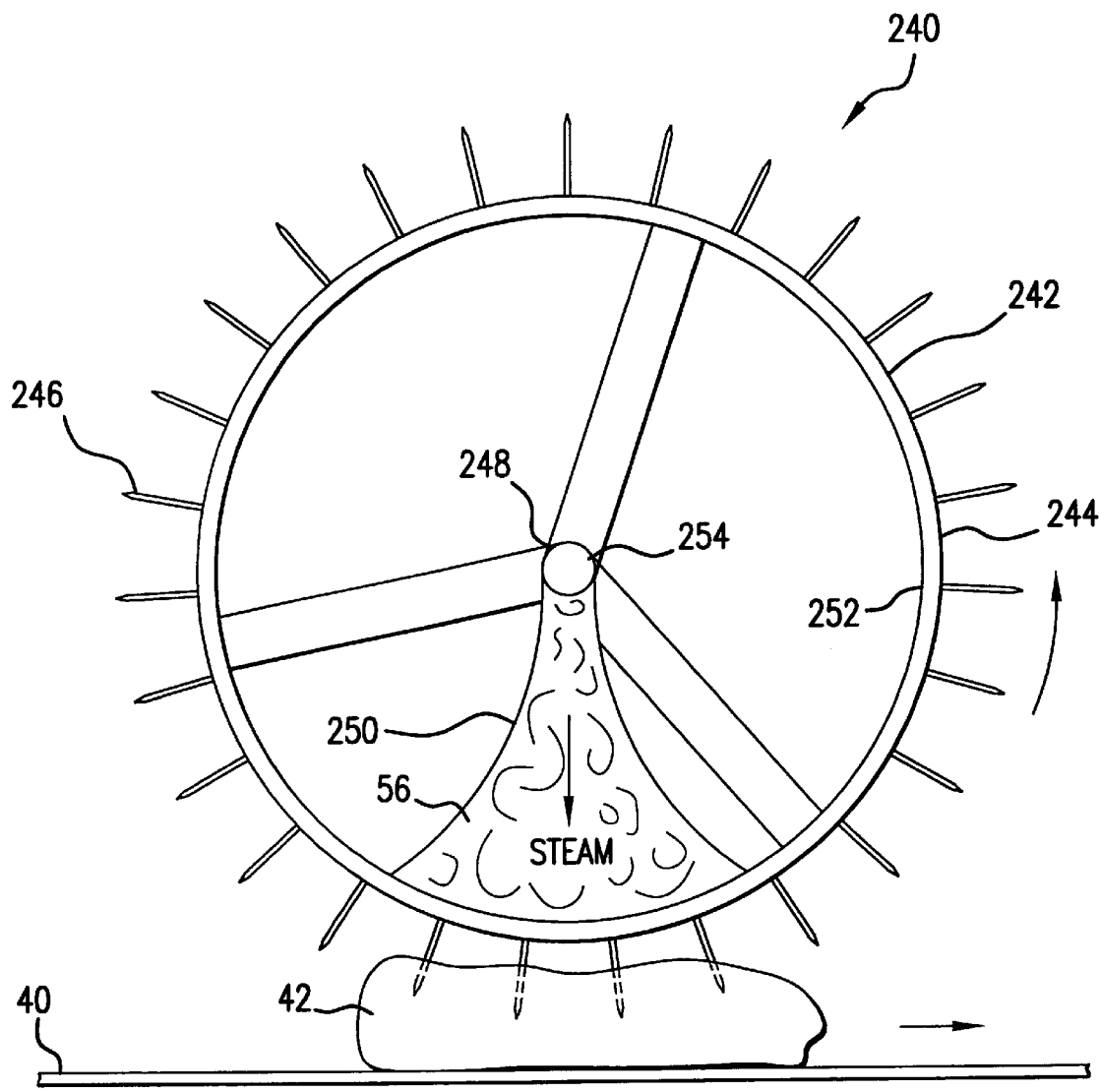
FIG. 10 is an alternate configuration of a continuous rotating injector manifold.

FIG. 10 illustrates another embodiment of a fluid injection apparatus, specifically a continuous injection manifold 240, which can effectively pre-cook the food items without repeatedly starting and stopping the underlying conveyor. The continuous injection manifold 240 incorporates a rotating injection manifold 244 including a roll structure (wheel or drum) 242 rotatable about a center 254. A plurality of injection needles 246 project from an outer periphery of manifold 244 at an angle which is generally orthogonal to the circumference of the roll 242. The roll is supported and positioned at a predetermined height in relation to the conveyor belt 40. Food product 42 on the conveyor belt 40 is pierced by the plurality of needles 246 as the food product 42 passes underneath the wheel 242.

The wheel 242 has an inlet 248 for intake of condensable cooking fluid, which is forced under pressure through a stationary manifold 250 and into the rotating manifold 244. The manifold 250 is sealed against the interior surface 252 of the wheel 242. The needles 246 have inlets (not shown) projecting through the wheel 242 such that when the needles 246 are beneath the manifold 244 the pressurized cooking fluid is forced through the needles 246 and injected into the food product 42. As in the previous embodiments, the condensable cooking fluid, desirably steam, condenses and releases heat energy as the vapor changes into a hot liquid. Because there is a phase change, much of the heat transfer from the fluid to the food product 42 occurs without changing the temperature of the cooking fluid.

Once the cooking fluid has changed phase into a liquid, the heat energy continues to be transferred into the interior of the food product 42 by conduction until the cooking fluid and the interior of the food product 42 are at equilibrium temperature. As with the manifolds 44 and 50 of the previous embodiments, the length and density of the needles 246, the size and width of the roll 242 as well as speed of rotation, and the dwell time and/or volume of fluid injected are controlled in relation to the speed of the conveyor belt 40 to optimize the cooking of the food product.

Figure 11:
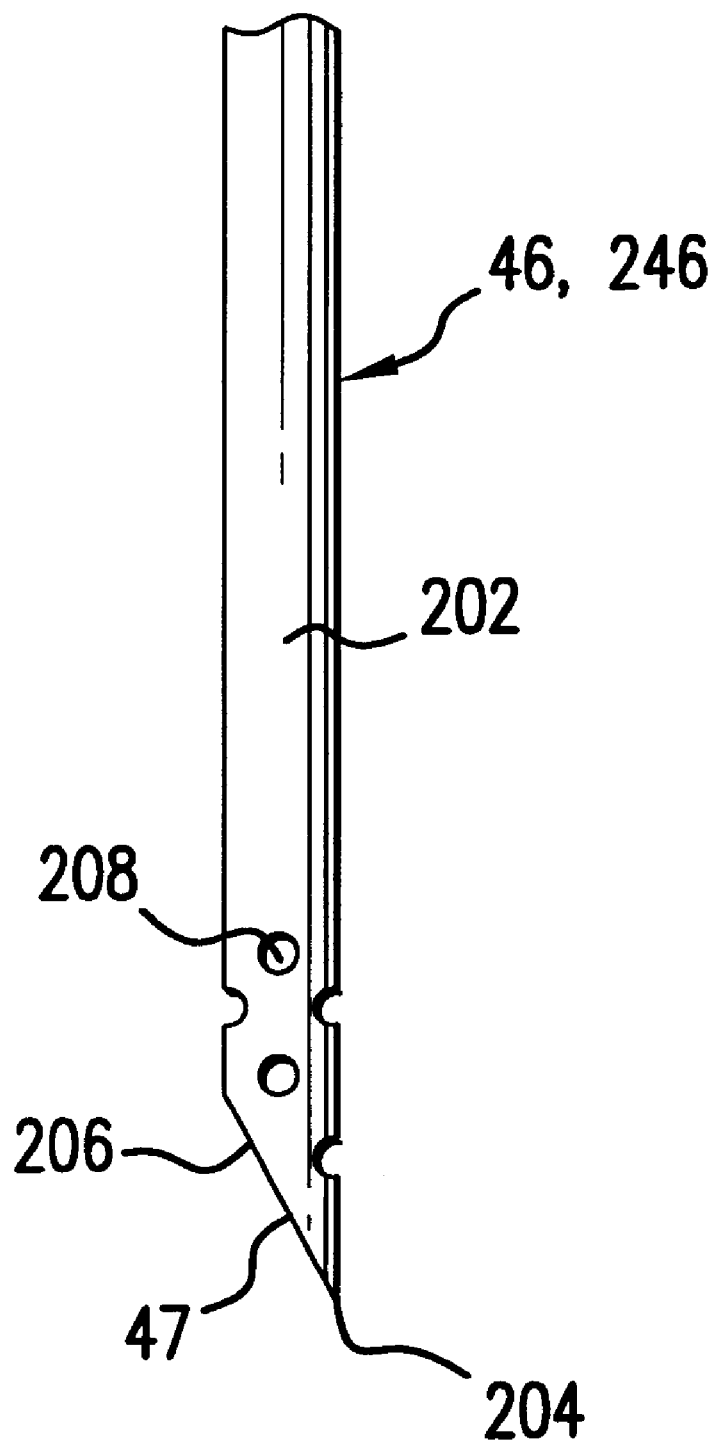
FIG. 11 is a side elevational view of an injector needle.

Referring now to FIG. 11, a preferred fluid injection needle 46, 246 of the present invention is shown. The needle 46, 246 includes a hollow metallic shaft 202 having a piercing end 206 terminating in a point 204. The body 202 has one or more apertures 208 near the piercing end 206, in addition to the main aperture 47 at the piercing end. These additional apertures allow for a larger area of the interior of the food product 42 to be subjected to the condensable cooking fluid immediately following injection. The needle 46, 246 is strong enough to withstand repeated contact with a bone of a food product 42 without damage. When the needle 46, 246 has a plurality (for example, four, six or eight) apertures 208 along its shaft 202, all of the apertures 208 should be positioned within the food product during steam injection. If some of the apertures 208 are not within the food product, the steam will tend to exit through those openings, reducing the effectiveness of the cooking.

The foregoing process and apparatus for cooking food with a condensable fluid provides a unique arrangement of process steps and components to allow a relatively small amount of fluid to be injected into the interior of a food product, to achieve time and energy-saving pre-cooking of the food. The invention overcomes limitations with respect to the amount of heat energy transferred to the food product, and especially to the center or bone area of bone-in food products. The ability to use the process and apparatus in conjunction with vision systems, product segregation and multiple manifolds enables optimization of the pre-cooking and cooking operations. The use of a continuous rotating manifold allows the conveyor belt to operate non-stop. The process and apparatus also provide the ability to pre-cook large food parts which typically cannot be economically cooked in a conventional convection oven. These and the other characteristics of the fluid injection process and apparatus provide a high confidence, efficient and versatile system which pre-cooks the injected food from the inside-out, and then from the outside-in using a conventional oven. The apparatus allows the food product to be subjected to less time and thermal energy in the conventional oven while achieving interior temperatures above the USDA minimum. The apparatus is versatile enough to be used in line along with other processing equipment or as an integral part of a conventional oven.

The foregoing descriptions of preferred embodiments of the invention are merely examples, and the invention is not to be limited to the preferred embodiments, as many variations or modifications would be apparent to those skilled in the art based upon the principles of the invention as set forth herein. Such variations or modifications are contemplated within the scope of the invention as set forth in the appended claims.

We claim:

1. A process for heating food from a first lower temperature to a second elevated temperature, comprising the steps of:
   extending into and retracting from the food a plurality of needles;
   injecting a condensable cooking fluid into an interior of the food as the needles are extending into and retracting from the food; and
   converting the condensable fluid from a gaseous phase to a liquid phase while in direct contact with the interior of the food, thereby heating the food from the first lower temperature to the second elevated temperature;
   wherein the condensable fluid is injected in an amount of about 0.01 to about 0.25 pounds of condensable fluid per pound of food being heated.

2. The process of claim 1, wherein the condensable fluid comprises steam.

3. The process of claim 1, wherein the first lower temperature is about 32–45° F.

4. The process of claim 3, wherein the second elevated temperature is about 80–130° F.

5. The process of claim 3, wherein the second elevated temperature is about 90–120° F.

6. The process of claim 1, wherein the condensable fluid is injected in an amount of about 0.02 to about 0.15 pounds of condensable fluid per pound of food being heated.

7. The process of claim 1, wherein the condensable fluid is injected in an amount of about 0.03 to about 0.08 pounds of condensable fluid per pound of food being cooked.

8. The process of claim 1, wherein the needles are spaced apart.

9. The process of claim 8, wherein the needles are substantially uniformly spaced apart.

10. The process of claim 8, wherein the needles are present in a density of about 1 to 30 needles per square inch.

11. The process of claim 8, wherein the needles are present in a density of about 3 to 25 needles per square inch.

12. The process of claim 8, wherein the needles are present in a density of about 5 to 20 needles per square inch.

13. A process for heating food from a first refrigeration temperature to a second cooking temperature, comprising the steps of:
   extending into and retracting from the food a plurality of needles;
   injecting steam into an interior of the food at a plurality of spaced-apart locations through the needles while the needles are extending into and retracting from the food; and
   condensing the steam while in direct contact with the interior of the food, thereby heating the food from the first refrigeration temperature to the second cooking temperature.

14. The process of claim 13, wherein the steam comprises superheated steam.

15. The process of claim 13, wherein the steam is supplied at a pressure of about 5–50 psig.

16. The process of claim 13, wherein the steam is supplied at a pressure of about 10–40 psig.

17. The process of claim 13, wherein the steam is supplied at a pressure of about 20–30 psig.

18. The process of claim 13, wherein the steam is injected for a period of about 1–60 seconds.

19. The process of claim 13, wherein the steam is injected for a period of about 2–30 seconds.

20. The process of claim 13, wherein the steam is injected for a period of about 3–10 seconds.

21. A process for heating food from a first temperature to a second temperature, comprising the steps of:
inserting a first plurality of spaced-apart injection needles into the food, the first plurality of injection needles penetrating a first surface of the food and moving toward a center of the food before being retracted;
inserting a second plurality of spaced-apart injection needles into a second side of the food, the second plurality of injection needles penetrating a second surface of the food and moving toward the center of the food before being retracted; and
injecting a condensable cooking fluid into an interior of the food through the injection needles, while the injection needles are moving, wherein at least some of the condensable cooking fluid is injected into the interior of the food through the second side of the food, thereby heating the food from the first temperature to the second temperature.

22. The process of claim 21, wherein at least some of the condensable cooking fluid is injected through the first plurality of needles while the needles are moving from the first surface toward the center of the food.

23. The process of claim 21, wherein at least some of the condensable cooking fluid is injected through the needles while the needles are being retracted.

24. The process of claim 21, further comprising the steps of stopping the needles within the food, and injecting at least some of the condensable cooking fluid while the needles are stopped.

25. The process of claim 21, wherein at least some of the condensable cooking fluid is injected into the second side of the food while the second plurality of needles are in motion.

26. The process of claim 21, further comprising the steps of stopping the second plurality of needles within the food, and injecting at least some of the condensable cooking fluid through the second side of the food while the needles are stopped.

27. A process for heating food from a first temperature to a second temperature, comprising the steps of:
inserting a first plurality of spaced apart injection needles into a first side of the food, the first plurality of injection needles penetrating a first surface of the food and moving toward a center of the food before being retracted;
inserting a second plurality of spaced-apart injection needles into a second side of the food, the second plurality of injection needles penetrating a second surface of the food and moving toward the center of the food before being retracted;
injecting steam into an interior of the food through the injection needles, thereby injecting at least some of the steam into the interior of the food through the first side and the second side of the food;
dispersing the steam within the interior of the food; and
condensing the steam while in contact with the interior of the food, thereby heating the food from the first temperature to the second temperature.

28. The process of claim 27, wherein the steam dispersion is effected by supplying the steam under pressure.

29. The process of claim 27, wherein the steam is supplied at a pressure of about 5–50 psig.

30. The process of claim 27, wherein the steam is supplied at a pressure of about 10–40 psig.

31. The process of claim 27, wherein the steam is supplied at a pressure of about 20–30 psig.

32. The process of claim 27, wherein the needles are present in a density of about 1 to 30 needles per square inch.

33. The process of claim 27, wherein the needles are present in a density of about 3 to 25 needles per square inch.

34. The process of claim 27, wherein the needles are present in a density of about 5 to 20 needles per square inch.

35. The process of claim 27, wherein each needle comprises an injection opening at one end of the needle.

36. The process of claim 35, wherein each needle further comprises one or more injection openings along a shaft of the needle.

37. The process of claim 27, wherein the first and second surfaces comprise opposing surfaces of the food.

38. A process for heating food from a first temperature to a second temperature without causing excessive loss of a flavorant within the food, comprising the steps of:
injecting a desired quantity of the flavorant into an interior of the food;
injecting steam into the interior of the food;
dispersing the steam within the food; and
condensing the steam while in direct contact with the interior of the food, thereby heating the food from the first temperature to the second temperature;
wherein the steam is injected in an amount of about 0.01 to about 0.25 pounds of steam per pound of food being heated.

39. The process of claim 38, wherein the steam is injected in an amount of about 0.02 to about 0.15 pounds of steam per pound of food being heated.

40. The process of claim 38, wherein the steam is injected in an amount of about 0.03 to 0.08 pounds of steam per pound of food being heated.

41. The process of claim 38, wherein the dispersing step is accomplished by supplying the steam under pressure.

42. The process of claim 38, wherein the steam is supplied at a pressure of about 5–50 psig.

43. The process of claim 38, wherein the steam is supplied at a pressure of about 10–40 psig.

44. The process of claim 38, wherein the steam is supplied at a pressure of about 20–30 psig.

45. The process of claim 38, wherein the steam is injected into the food for a period of about 1–60 seconds.

46. The process of claim 38, wherein the steam is injected into the food for a period of about 2–30 seconds.

47. The process of claim 38, wherein the steam is injected into the food for a period of about 3–10 seconds.

48. The process of claim 38, wherein the steam is injected using a plurality of spaced-apart injection needles.

49. The process of claim 48, wherein dispersion of the steam is accomplished by injecting the steam while the needles are in motion.

50. The process of claim 38, wherein the flavorant comprises a marinade.

51. A continuous process for heating food items from a first temperature to a second temperature, comprising the steps of:
moving a plurality of successive food items along a conveyor;
providing a plurality of fluid injection needles mounted to a rotating drum or wheel near the conveyor;

penetrating the successive food items with the fluid injection needles for a period of time as the food items pass the rotating drum or wheel; and injecting a condensable cooking fluid into the successive food items while the needles are penetrating the food items, thereby heating the food items from the first temperature to the second temperature.

52. The process of claim 51, wherein the condensable fluid comprises steam.

53. The process of claim 51, wherein the fluid injection needles are uniformly spaced apart on an outer surface of the rotating drum or wheel.

54. The process of claim 51, wherein each needle comprises an injection opening at one end of the needle.

55. The process of claims 54, wherein each needle further comprises one or more injection openings along a shaft of the needle.

56. A process for making prepared meals and meal items, comprising the steps of:

loading uncooked meals or meal items successively onto a conveyor belt;

moving each meal or meal item to a pre-cooking station;

pre-cooking each meal or meal item by injecting a condensable cooking fluid into an interior of the meal or meal item, and condensing the cooking fluid while in contact with the interior;

moving each pre-cooked meal or meal item to a hot air oven;

thoroughly cooking the meal or meal item in the hot air oven;

freezing the cooked meal or meal item; and packaging the cooled meal or meal item.

57. The process of claim 56, wherein the condensable cooking fluid comprises steam.

58. The process of claim 56, wherein the pre-cooking includes the step of heating the interior of the meal or meal item from a first temperature between about 32–45° F. and a second temperature between about 80–130° F.

59. The process of claim 58, wherein the second temperature is between about 90–120° F.

60. The process of claim 58, wherein the thorough cooking in the hot air oven includes the step of thoroughly heating the meal or meal item to a third temperature of at least 160° F.

61. The process of claim 60, wherein the third temperature is about 180–200° F.

62. The process of claim 56, wherein the condensable fluid is supplied under pressure.

63. The process of claim 56, wherein the conveyor belt is stopped while the condensable cooking fluid is being injected into each successive meal or meal item.

64. The process of claim 56, wherein the conveyor belt continues to move, and is not stopped during injection of the condensable cooking fluid.

65. The process of claim 56, further comprising the steps of dusting, battering and breading each pre-cooked meal or meal item.

66. The process of claim 56, further comprising the step of frying each pre-cooked meal or meal item.

67. The process of claim 56, further comprising the steps of:

identifying different meals or meal items on a primary conveyor;

diverting the different meals or meal items onto a plurality of secondary conveyors; and separately processing the different meals or meal items.

68. The process of claim 67, wherein the different meals or meal items are identified with the aid of a vision system.

* * * * *